3,351,580
DISAZO DISPERSE DYESTUFFS
Eiji Koike and Fujio Kanazawa, Toyonaka-shi, and Hideo Otsuka, Fuse-shi, Japan, assignors to Sumitomo Chemical Company, Ltd. and Toyo Spinning Co., Ltd., both of Osaka, Japan, both corporations of Japan
No Drawing. Filed Aug. 13, 1963, Ser. No. 301,883
Claims priority, application Japan, Aug. 14, 1962, 37/35,224
6 Claims. (Cl. 260—160)

The present invention relates to new disazo disperse dyestuffs, having the general formula,

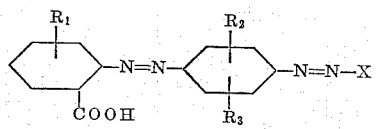

wherein $R_1$ represents a member selected from the group consisting of hydrogen atom, halogen atom and nitro radical, $R_2$ and $R_3$ represent a member selected from the group consisting of hydrogen atom, alkyl radical, alkoxy radical and halogen atom, respectively, and X represents an azo component, particularly, phenolic, naphtholic, aniline, acetoacidanilide, pyrazolone or carbazole members free from solubilizing radical such as sulfo and carboxyl radicals; and to a method for producing the same.

An object of the present invention is to provide new disazo disperse dyestuffs which have excellent dyeability to fibers, films and the like shaped articles, particularly to synthetic fibers, containing polyolefine such as polyethylene and polypropylene. Another object is to provide a method for producing the disazo disperse dyestuffs as mentioned above. Still another object is to provide a method of dyeing synthetic fibers, films and the like shaped articles, containing polyolefine such as polyethylene and polypropylene with high fastnesses to light, organic solvents, and washing. Further object is to provide synthetic fiber, films and the like shaped articles containing polyolefine such as polyethylene and polypropylene which are dyed with a dyestuff as mentioned above. Other objects would be apparent from the following description.

The disazo disperse dyestuffs according to the invention may be produced by coupling a diazotized monoazoamino compound having the general formula,

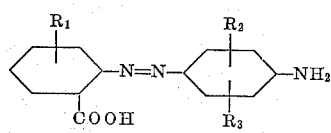

wherein $R_1$ represents a member selected from the group consisting of hydrogen atom, halogen atom and nitro radical, and $R_2$ and $R_3$ represent a member selected from the group consisting of hydrogen atom, alkyl radical, alkoxy radical and halogen atom, respectively, with an azo component free from solubilizing radical such as sulfo and carboxyl radicals.

The monoazo-amino compounds set forth hereinbefore include 4 - amino - 2 - methyl - 1,1' - azobenzene - 2'-carboxylic acid, 4 - amino - 2 - methyl - 5 - methoxy - 1, 1' - azobenzene - 2' - carboxylic acid, 4 - amino - 2 - methyl - 5' - nitro - 1,1' - azobenzene - 2' - carboxylic acid, 4 - amino - 2 - methyl - 4' - chloro - 1,1' - azobenzene-2'-carboxylic acid, and the like. These monoazo-amino compounds may be produced by coupling a diazotized amino compound (first component) having the general formula,

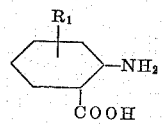

wherein $R_1$ represents a member selected from the group consisting of hydrogen atom, halogen atom and nitro radical, with an amino compound (second component) having the general formula,

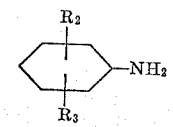

wherein $R_2$ and $R_3$ represent a member selected from the group consisting of hydrogen atom, alkyl radical, alkoxy radical and halogen atom, respectively.

Examples of the first component involve 2-aminobenzoic acid, 2-amino-4-chlorobenzoic acid, 2-amino-3-nitrobenzoic acid, 2-amino-4-nitrobenzoic acid, 2-amino-5-nitrobenzoic acid, 2-amino-6-nitrobenzoic acid, and the like.

Examples of the second component involve aniline, 2 - methylaniline, 2 - ethylaniline, 2 - methoxyaniline, 2-ethoxyaniline, 2-chloroaniline, (these being employed in the form of the ω-methanesulfonic acid derivative in most cases), 3 - methylaniline, 2,5 - dimethoxyaniline, 2,5-diethoxy, 2,5 - dimethylaniline, 2,3 - dimethylaniline, 2-methoxy - 5 - methyl-anilino, 2 - chloro - 5 - methoxyaniline, 2-methoxy-5-chloroaniline, and the like.

The monoazo-amino compounds produced by coupling a diazotized first component with a second component, are further diazotized and coupled with an azo component free from solubilizing radical such as sulfo and carboxyl radicals, (third component). The procedure for the diazotization and coupling may be obvious to those skilled in the art.

The third component may be any of conventional azo components free from solubilizing radical such as sulfo and carboxy radicals, but is preferably chosen from phenols having the general formula,

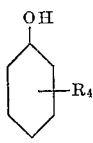

wherein $R_4$ is a member selected from hydrogen and halogen atoms, and alkyl and cycloalkyl radicals having 1 to 12 carbon atoms; naphthols, substituted anilines having the general formula,

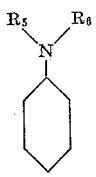

wherein $R_5$ and $R_6$ each represents a member selected from alkyl and cycloalkyl radicals having 1 to 12 carbon atoms; phenylmethylpyrazolones, acetoacetylanilides having the general formula,

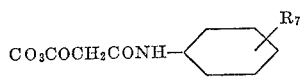

wherein $R_7$ represents a member selected from hydrogen atom, halogen atoms, and lower alkoxy radicals; and hydroxybenzocarbazoles.

Examples of the third component involve, among others, phenol, 2-chlorophenol, 3-chlorophenol, 4-chlorophenol, 2-methylphenol, 3-methylphenol, 4-methylphenol, 4-n-butylphenol, 4-tert.-butylphenol, 4-tert.-amylphenol, 4-tert.-octylphenol, 4-cyclohexylphenol, 1-hydroxynaphthalene, 2 - hydroxynaphthalene, N-monomethylaniline, N,N - dimethylaniline, N,N - diethylaniline, N - dodecylaniline, N-cyclohexylaniline, 1 - phenyl - 3 - methyl - 5-pyrazolone, acetoacetylanilide, acetoacetyl - o - chloroanilide, acetoacetyl-o-methoxyanilide, 4 - hydroxy - 1',2'-benzocarbazole, and the like.

By the above-mentioned coupling procedure with the third component, the new disazo dyestuffs of the present invention are obtained.

The disazo dyestuffs according to the present invention are adequately used for dyeing of fibers (in the form of thread, yarn, and woven and knitted fabrics and textiles), films and other shaped articles, containing polyolefines, for example, polyethylene and polypropylene, under disperse dyeing condition, for example at a bath temperature of 80° to 120° C. in the presence of a disperse agent. The thus dyed article has high fastnesses to light, washing, organic solvents, and sublimation. One reason why the disazo dyestuffs of the present invention exhibit high exhaustion and fastnesses to polyolefine articles, is presumably that the carboxyl radical in the molecule forms a hydrogen bond to the azo group present at the ortho-position.

On the other hand, carboxyl radical at meta- or para-position to azo group forms no hydrogen bond to the azo group, and merely displays its inorganic properties, therefore, it lowers the absorbability of the dyes to the articles.

The disazo dyestuffs according to the present invention are also suitable to other hydrophobic fibers, such as aromatic polyester fibers, cellulose acetate fibers, and others. It is a significant feature in these cases, that the dyed fibers exhibits excellent fastness to sublimation.

The disazo dyestuffs according to the present invention may be used in particles finely divided by a suitable means, more preferably, as a mixture of such particles with an agent such as alkylnaphthalenesulfonic acid-formaldehyde condensate. Dyeing of polyolefine fibers is effected, as in the ordinary disperse dyestuffs, in the form of an aqueous dispersion or suspension at a bath temperature of 80° to 120° C., in the presence of an anionic or nonionic surface active agent, as the case may be.

The present invention will be more fully explained with respect to the following examples, which are, however, set forth merely by way of illustration and not by way of limitation. All parts and percentages are by weight unless otherwise identified.

*Example 1*

To 500 parts of water, 25.5 parts of 4-amino-2-methyl-1,1'-azobenzene-2'-carboxylic acid is added and the mixture is stirred until a homogeneous dispersion is obtained. After 25 parts of 35% hydrochloric acid is added to the solution, 7.1 parts of sodium nitrite dissolved in water is added at 10°–15° C. thereto to proceed diazotization. The diazotization reaction is finished within 2.5–3 hours at 10°–15° C.

On the other hand, a solution of 14.4 parts of 2-hydroxynaphthalene, 6 parts of sodium hydroxide and 8 parts of soda ash, dissolved in 150 parts of water, is cooled by adding 100 parts of ice. The solution of diazotized monoazo-amino compound prepared as above is added dropwise thereto, while maintaining the temperature of the reaction mixture at not higher than 5° C. After the dropping is finished, the stirring is continued for 2 hours, and the crystals isolated are separated by filtration, washed with water and dried. The dyestuff thus obtained is a dark brown powder represented by the following formula.

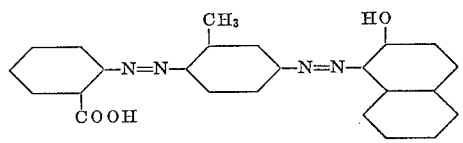

The dyestuff is capable of dyeing synthetic fibers such as polyolefine and polyester in red color.

*Example 2*

To 400 parts of water, 28.5 parts of 4-amino-2-methyl-5-methoxy-1,1'-azobenzene-2'-carboxylic acid is added, and the mixture is stirred until it changes to a homogeneous dispersion. Further, 4 parts of sodium hydroxide is added thereto to obtain a solution. Then, 7.1 parts of sodium nitrite is added thereto and they are dissolved under continuing stirring. The solution is added dropwise into a mixture of 100 parts of ice water and 35 parts of 35% hydrochloric acid under cooling at 5°–10° C. and the stirring is continued for 3 hours for diazotization.

To 150 parts of water, 10.8 parts of 2-methylphenol, 6 parts of sodium hydroxide, and 5 parts of soda ash are added, and the mixture is stirred to make a solution.

The solution is cooled by addition of 100 parts of ice, added with the above prepared solution of diazotized monoazo-amino compound dropwise at below 5° C., and stirred for 2 hours. The isolated crystals through the coupling reaction are separated by filtration, washed with water and dried. Thus obtained yellowish brown dyestuff is represented by the following formula.

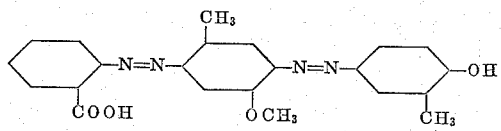

The dyestuff is able to dye synthetic fibers such as polyolefine and polyester in orange color.

*Example 3*

In the same method as described in the Example 1, 4-amino-2-methyl-1,1'-azobenzene-2'-carboxylic acid is diazotized, and coupled with 20.6 parts of 4-tert.-octylphenol in place of 2-hydroxynaphthalene used in the Example 1. The dyestuff represented by the following formula is obtained.

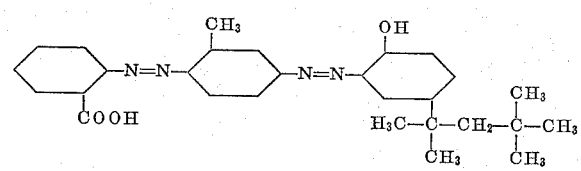

The dyestuff is able to dye synthetic fibers such as polyolefine and polyester in reddish yellow color.

*Example 4*

Two parts of disazo dyestuff represented by the following formula,

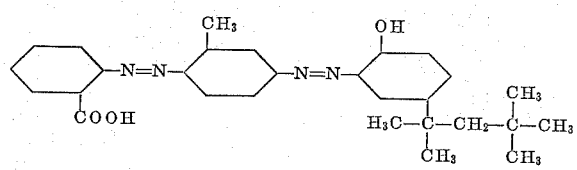

which is obtained by coupling diazotized 4-amino-2-methyl-1,1'-azobenzene-2'-carboxylic acid with 4-octylphenol (containing 4-tert.-octylphenol as principal ingredient), is finely divided and added to an aqueous solution of 3 parts of sodium oleyl sulfate in 8,000 parts of water.

Into the dispersion of the dyestuff, 200 parts of a fabric made of polyolefine fiber, is dipped and the temperature is raised slowly up to 80°–120° C., and the fabric is dyed at this temperature for 1 hour. Then, the fabric is washed with 0.2% aqueous sodium alkylbenzene-sulfonate solution (bath ratio 1:50) at 95° C. for 10 minutes, then washed with water and dried.

In this way, the polyolefine fiber can be dyed in reddish yellow color with high fastness to light, washing, organic solvents and rubbing.

*Example 5*

A dyeing is carried out in the same way as in the Example 4, except that 2 parts of dyestuff represented by the following formula,

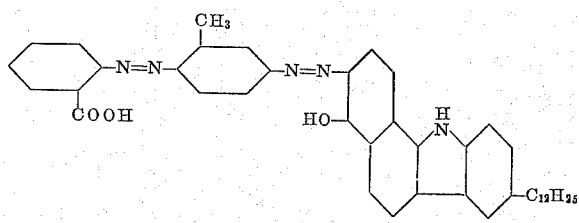

which is obtained by coupling diazotized 4-amino-2-methyl-1,1'-azobenzene-2'-carboxylic acid with 4-hydroxy-8-dodecyl-1',2'-benzocarbazol, is used in place of the dyestuff used in the Example 4. Polyolefine fabric is dyed in reddish brown color with high fastnesses to light, washing and organic solvents.

*Example 6*

A dyeing is carried out in the same way as in the Example 4, except that the dyestuff represented by the following formula,

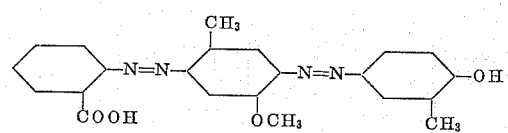

which is obtained by coupling diazotized 4-amino-2-methyl-5-methoxy-1,1'-azobenzene-2'-carboxylic acid with 2-methyl-phenol is used. Polyolefine fabric is dyed in orange color with operatively high fastnesses.

*Example 7*

The following table sets forth other disazo dyestuffs according to the present invention and the color tones when dyed onto a polyolefine fabric according to the invention. In the table, column I shows monoazo-amino components prepared by coupling of a diazotized first component with a second component. Column II shows third components to be coupled with the diazotized monoazo-amino components. Column III shows the disazo dyestuffs obtained by coupling the diazotized monoazo-amino component with the third component. Column IV shows the color tones on polyolefine fabric.

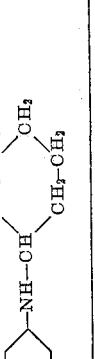

| | I | II | III | IV |
|---|---|---|---|---|
| 7 | CH₃–C₆H₃(OCH₃)(NH₂)–N=N–C₆H₄(COOH) | H₃C–CO–NH–, COCH₃ | CH₃–C₆H₃(OCH₃)(N=N–CH(COCH₃)–CO–NH–C₆H₄–Cl)–N=N–C₆H₄(COOH) | Yellow. |
| 8 | CH₃–C₆H₃(OCH₃)(NH₂)–N=N–C₆H₃(Cl)(COOH) | –NH–CH(cyclohexyl)– | CH₃–C₆H₃(OCH₃)(N=N–C₆H₄–NH–CH(cyclohexyl))–N=N–C₆H₃(Cl)(COOH) | Light brown. |
| 9 | CH₃–C₆H₃(NH₂)–N=N–C₆H₄(COOH) | –N(C₂H₅)(C₂H₄O·CO·CH₃) | CH₃–C₆H₃(N=N–C₆H₄–N(C₂H₅)(C₂H₄O·CO·CH₃))–N=N–C₆H₄(COOH) | Reddish orange. |
| 10 | CH₃–C₆H₃(NH₂)–N=N–C₆H₄(COOH) | naphthol (OH) | CH₃–C₆H₃(N=N–naphthol)–N=N–C₆H₄(COOH) | Red. |
| 11 | CH₃–C₆H₃(OCH₃)(NH₂)–N=N–C₆H₄(COOH) | H₃C–CO–NH–, COCH₃ | CH₃–C₆H₃(OCH₃)(N=N–C₆H₄–CH₃ with N–CH(COCH₃)–CO–NH side)–N=N–C₆H₄(COOH) | Yellow. |
| 12 | CH₃–C₆H₃(NH₂)–N=N–C₆H₄(COOH) | –N(C₂H₅)(C₂H₄O·CO·CH₃) | CH₃–C₆H₃(N=N–C₆H₄–N(C₂H₅)(C₂H₄O·CO·CH₃))–N=N–C₆H₄(COOH) | Reddish orange. |

What we claim is:
1. A disazo disperse dyestuff having the general formula,

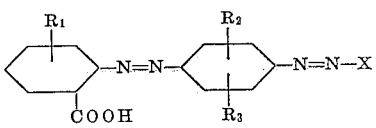

wherein $R_1$ represents a member selected from the group consisting of hydrogen atom, chlorine atom and nitro radical, $R_2$ and $R_3$ represent a member selected from the group consisting of hydrogen atom, lower alkyl radical, lower alkoxy radical and chlorine atom, respectively, and X represents a phenolic, aniline, acetoacidanilide, pyrazolone or carbazole member free from sulfo and carboxyl radicals.

2. A disazo disperse dyestuff having the general formula

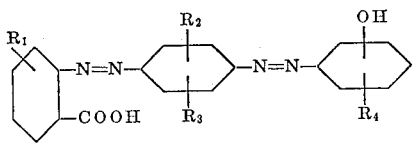

wherein $R_1$ represents a member selected from the group consisting of hydrogen atom, chlorine atom and nitro radical, $R_2$ and $R_3$ represent a member selected from the group consisting of hydrogen atom, lower alkyl radical and lower alkoxy radical, respectively, and $R_4$ represents a member selected from the group consisting of hydrogen atom and alkyl radicals having 1 to 12 carbon atoms.

3. A disazo disperse dyestuff having the general formula:

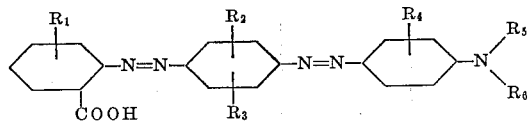

wherein $R_1$ represents a member selected from the group consisting of hydrogen atom, chlorine atom and nitro radical, $R_2$ and $R_3$ represent a member selected from the group consisting of hydrogen atom, lower alkyl radical and lower alkoxy radical, respectively, and $R_4$ represents a member selected from the group consisting of hydrogen atom and lower alkyl, $R_5$ represents a member selected from the group consisting of hydrogen atom and lower alkyl, and $R_6$ represents a member selected from the group consisting of hydrogen atom, cyclohexyl radical and acetoxyethyl radical.

4. A disazo disperse dyestuff having the general formula:

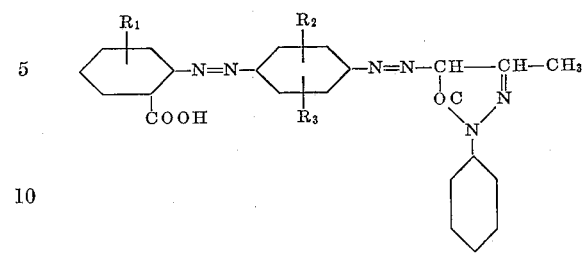

wherein $R_1$ represents a member selected from the group consisting of hydrogen atom, chlorine atom and nitro radical, and $R_2$ and $R_3$ represent a member selected from the group consisting of hydrogen atom, lower alkyl radical and lower alkoxy radical, respectively.

5. A disazo disperse dyestuff having the general formula:

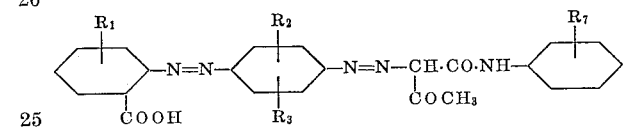

wherein $R_1$ represents a member selected from the group consisting of hydrogen atom, chlorine atom and nitro radical, $R_2$ and $R_3$ represent a member selected from the group consisting of hydrogen atom, lower alkyl radical and lower alkoxy radical, respectively, and $R_7$ represents a member selected from the group consisting of hydrogen atom, lower alkyl radical and chlorine atom.

6. A disazo disperse dyestuff having the general formula:

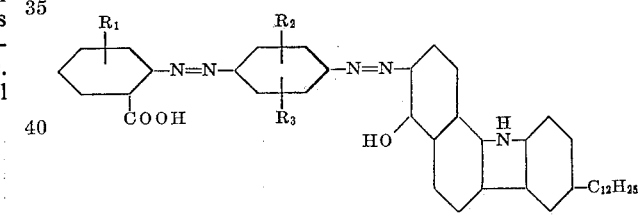

wherein $R_1$ represents a member selected from the group consisting of hydrogen atom, chlorine atom and nitro radical, and $R_2$ and $R_3$ represent a member selected from the group consisting of hydrogen atom, lower alkyl radical and lower alkoxy radical, respectively.

References Cited

UNITED STATES PATENTS 993,549  5/1911  Richard _____ 260—191

FOREIGN PATENTS 305,005  4/1955  Switzerland.

CHARLES B. PARKER, *Primary Examiner.*

D. M. PAPUGA, *Assistant Examiner.*